(12) United States Patent
Sung et al.

(10) Patent No.: US 10,003,201 B2
(45) Date of Patent: Jun. 19, 2018

(54) ELECTRONIC DEVICE AND METHOD FOR APPLYING POWER DEPENDING ON WHETHER ACCESSORY IS CHARGED

(71) Applicant: Samsung Electronics Co., Ltd., Gyeonggi-do (KR)

(72) Inventors: Jung-Oh Sung, Gyeonggi-do (KR); Myung-Hoon Kwak, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 893 days.

(21) Appl. No.: 14/274,092

(22) Filed: May 9, 2014

(65) Prior Publication Data

US 2014/0354080 A1 Dec. 4, 2014

(30) Foreign Application Priority Data

Jun. 4, 2013 (KR) ........................ 10-2013-0064182

(51) Int. Cl.
*H02J 4/00* (2006.01)
*G06F 1/26* (2006.01)
*H02J 7/00* (2006.01)

(52) U.S. Cl.
CPC ................ *H02J 4/00* (2013.01); *G06F 1/263* (2013.01); *G06F 1/266* (2013.01); *H02J 7/0036* (2013.01); *Y10T 307/826* (2015.04)

(58) Field of Classification Search
CPC .......... H02J 4/00; H02J 7/0036; H02J 7/0006; G06F 1/266; G06F 1/263; Y10T 307/826; H01R 25/162

(Continued)

(56) References Cited

U.S. PATENT DOCUMENTS 7,683,573 B2 3/2010 Nikazm et al.
2002/0181700 A1* 12/2002 Unno .................... G06F 1/263
379/413

(Continued)

FOREIGN PATENT DOCUMENTS

CN 1614851 A 5/2005
CN 101425048 A 5/2009

(Continued)

OTHER PUBLICATIONS

Australian Notice of Acceptance dated Sep. 12, 2016.

(Continued)

*Primary Examiner* — Rexford Barnie
*Assistant Examiner* — Thai Tran
(74) *Attorney, Agent, or Firm* — Cha & Reiter, LLC (57) ABSTRACT

A method is employed by an electronic device for managing power used by an associated accessory device attached to the electronic device. The method includes applying a current to the accessory device and in response to the applied current, at least one of first and second identifier resistances are identified in the accessory device. The method determines whether the accessory device is connected to a power supply in response to the at least one of identified first and second identifier resistances and applies power to the accessory device in response to a determination the accessory device is not connected to the power supply.

10 Claims, 10 Drawing Sheets

(58) Field of Classification Search
USPC ............................................................ 307/125
See application file for complete search history.

(56) References Cited

U.S. PATENT DOCUMENTS

| | | | | |
|---|---|---|---|---|
| 2003/0236644 | A1* | 12/2003 | Lara | G01B 31/31835 702/121 |
| 2004/0042138 | A1* | 3/2004 | Saito | G06F 1/266 361/90 |
| 2005/0062459 | A1 | 3/2005 | Young et al. | |
| 2005/0264262 | A1 | 12/2005 | Kang et al. | |
| 2006/0091859 | A1 | 5/2006 | Jau et al. | |
| 2006/0095641 | A1* | 5/2006 | Pandit | G06F 1/266 710/313 |
| 2008/0238201 | A1* | 10/2008 | Oliver | H02J 7/0029 307/43 |
| 2008/0307144 | A1* | 12/2008 | Minoo | G06F 1/1632 710/304 |
| 2009/0108854 | A1 | 4/2009 | Agevik et al. | |
| 2010/0301674 | A1 | 12/2010 | Lin | |
| 2010/0318814 | A1 | 12/2010 | Chung et al. | |
| 2011/0167281 | A1 | 7/2011 | Rathi et al. | |
| 2013/0002195 | A1 | 1/2013 | Lee et al. | |

FOREIGN PATENT DOCUMENTS

| | | |
|---|---|---|
| CN | 201774101 U | 3/2011 |
| CN | 102187544 A | 9/2011 |
| KR | 10-2005-0112539 A | 12/2005 |
| KR | 10-2009-0094725 A | 9/2009 |

OTHER PUBLICATIONS

European Search Report dated Feb. 9, 2017.
Australian Search Report, dated May 10, 2016.
Chinese Search Report dated Jun. 26, 2017.

\* cited by examiner

ELECTRONIC DEVICE AND METHOD FOR APPLYING POWER DEPENDING ON WHETHER ACCESSORY IS CHARGED

CLAIM OF PRIORITY

This application claims priority under 35 U.S.C. § 119 to an application filed in the Korean Intellectual Property Office on Jun. 4, 2013 and assigned Serial No. 10-2013-0064182, the contents of which are incorporated herein by reference.

BACKGROUND

1. Technical Field

The present system concerns managing the application of power in an electronic device in response to whether or not an accessory is charged, for example.

2. Description of the Related Art

Known different accessories are connectable to an electronic device including a multimedia dock and a large size monitor to enable a small-sized screen displayed on the electronic device to be seen on a large-sized screen. However, known accessories are charged by different methods including using power from a charger and using power from a power supply of an electronic device. Known electronic device systems lack comprehensive capability for adaptive power management in conjunction with electronic device accessories.

SUMMARY

The inventors have recognized a need for a user friendly adaptive power management system for managing power provided to electronic device accessories in response to whether a power supply device is connected to an accessory determined using an identifier resistance value associated with a respective corresponding accessory.

A method is employed by an electronic device for managing power used by an associated accessory device attached to the electronic device. The method includes applying a current to the accessory device and in response to the applied current, at least one of first and second identifier resistances are identified in the accessory device. The method determines whether the accessory device is connected to a power supply in response to the at least one of identified first and second identifier resistances and applies power to the accessory device in response to a determination the accessory device is not connected to the power supply.

In a feature, the method identifies that the accessory device is not connected to the power supply in response to identifying the first identifier resistance and identifies that the accessory device is connected to the power supply in response to identifying the second identifier resistance. Further, power is applied to the accessory device in response to determining that the accessory device is not connected to the power supply and the method determines not to apply power to the accessory device when it is determined that the accessory device is connected to the power supply. Also the method identifies that power is applied to the accessory device and that the accessory device operates using power from the power supply connected to the electronic device in response to determining not to apply power to the accessory device.

In another feature, a method employed by an accessory device attached to an electronic device, selects a first switch state in response to a determination of whether power is applied from a power supply device. The first switch is used in the selected switch state for at least one of, (a) operating functions of the accessory device using power received from the electronic device and (b) operating functions of the accessory device while applying power from the power supply device to the electronic device, in response to the determination of whether power is applied from the power supply device. The state of a second switch is changed from open to closed in response to power being applied from the power supply device and the method identifies, the second switch is closed and a first identifier resistor and a second identifier resistor connected in parallel, are connected to the electronic device.

The method identifies that the second switch is open when power is not applied from the power supply device and identifies that the second switch is open and a first identifier resistor is connected to the electronic device. The state of the first switch is changed from open to closed in response to power being applied from the power supply device and the first switch is identified as open when the power supply device is not providing power. Also functions of the accessory device are operated while applying power from the power supply device to the electronic device when the first switch is closed and functions of the accessory device are operated using power received from the electronic device when the first switch is open. The first switch is connected in parallel to the second switch.

In another feature, a processor module recognizes at least one of first and second identifier resistances by applying a current to an accessory device and determines whether the accessory device is connected to a power supply in response to at least one recognized identifier resistance, and determines whether to apply power to the accessory device in response to the determination of whether the accessory device is connected to a power supply. A memory stores data used by the processor module. The processor module identifies that the accessory device is not connected to the power supply in response to identifying the first identifier resistance and identifies that the accessory device is connected to the power supply in response to identifying the second identifier resistance. The processor module initiates applying power to the accessory device in response to determining the accessory device is not connected to the power supply and does not apply power to the accessory device in response to determining the accessory device is connected to the power supply. The processor module further applies power to the accessory device and identifies that power is applied to the accessory device and identifies that the accessory device operates using power provided by the power supply connected to the electronic device.

An accessory device attached to an electronic device includes a control unit and storage unit. The control unit selects a first switch state in response to a determination of whether power is applied from a power supply device and identifies at least one of, (a) the accessory device operates by receiving power from an electronic device and (b) the accessory device operates while applying power from the power supply device to the electronic device, in response to the selected first switch state. The storage unit for storing data used by the control unit. Also the control unit changes the state of a second switch from open to closed when the power from the power supply device is applied and identifies first and second identifier resistors are connected in parallel to the electronic device. The control unit identifies that a second switch is open when the power supply device is not applying power to the accessory device and identifies that a first identifier resistor is connected to the electronic device.

In addition, the control unit identifies that the first switch changes state from open to closed when power is applied from the power supply device, identifies that the first switch is open when the power supply device is not supplying power to the accessory device. The control unit identifies that the apparatus operates by receiving power from the electronic device when the first switch is open. Further, the first switch is connected in parallel with a second switch.

BRIEF DESCRIPTION OF THE DRAWINGS

The above features and advantages of the present disclosure will become more apparent from the following detailed description when taken in conjunction with the accompanying drawings in which.

DETAILED DESCRIPTION

Exemplary embodiments are described herein below with reference to the accompanying drawings. For the purposes of clarity and simplicity, detailed descriptions of well-known functions or configurations will be omitted as they would unnecessarily obscure the subject matters of the present disclosure. Like reference numerals denote like elements throughout the drawings.

Figure 1:
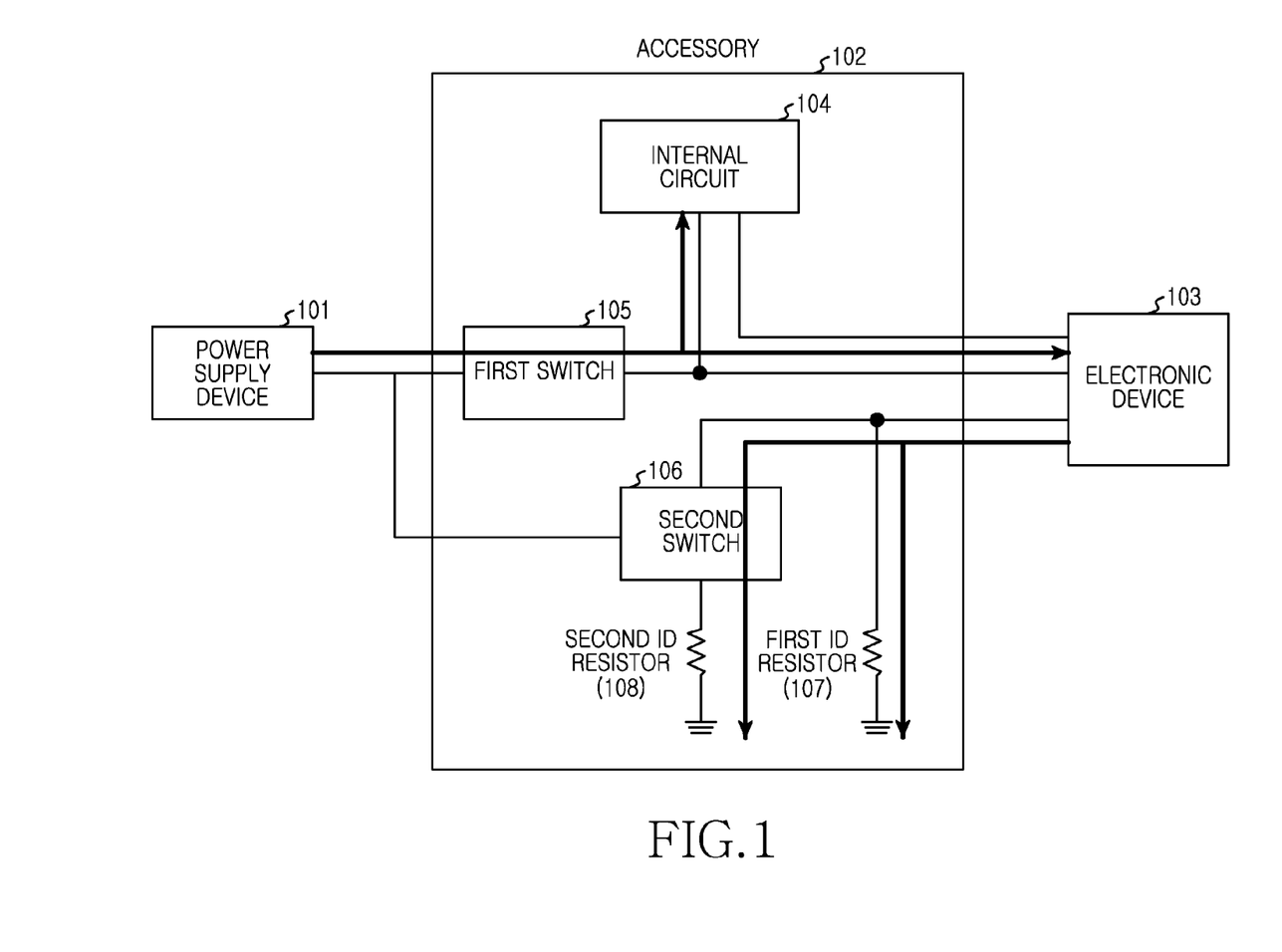
FIG. 1 shows an accessory and an electronic device connected to a power supply device according to invention principles.

FIG. 1 shows an accessory and an electronic device connected to a power supply device including a power supply device 101, an accessory 102 and an electronic device 103. The power supply device 101 may be defined as a device for applying power to the accessory 102. For example, the power supply device 101 may be an adapter for applying power to the accessory 102. The accessory 102 may include an internal circuit 104, a first switch 105, a second switch 106, a first ID resistor 107, and a second ID resistor 108. The internal circuit 104 included in the accessory 102 may be implemented using various circuits respectively configured according to the characteristics of respective accessories. Herein, the accessory 102 may be various peripheral devices associated with the electronic device, such as a multimedia dock, a HDMI (High-Definition Multimedia Interface) gender changer, and a USB (Universal Serial Bus) gender changer. The first switch 105 included in the accessory 102 may be connected to the power supply device 101 and to the internal circuit 104 and the electronic device 103. Herein, the first switch 105 may be implemented by a device for serving as a switch, such as a power FET (field effect transistor), a forward diode, and a switch manufactured using a single IC, for example.

In addition, the first switch 105 may operate differently depending on whether the accessory 102 is being supplied with power from the power supply device 101. Specifically, in response to the accessory 102 being connected to the power supply device 101 and being supplied with power, open first switch 105 closes. Specifically, when the accessory 102 is supplied with power from the power supply device 101, open first switch 105 closes to apply power from the power supply device 101 to the internal circuit 104 and the electronic device 103. The second switch 106 included in the accessory 102 may be connected to the power supply device 101, and to the first ID resistor 107 and the electronic device 103 and is in series with the second ID resistor 108. The second switch 106 may be implemented by a device for serving as a switch, such as a BJT (Bipolar Junction Transistor), a FET, and an analogue switch, for example.

In addition, the second switch 106 may operate differently depending on whether the accessory 102 is being supplied with power from the power supply device 101. Specifically, in response to the accessory 102 being supplied with power from the power supply device 101, open second switch 106 closes. That is, since the second switch 106 is closed when the accessory 102 is connected to the power supply device 101, the first ID resistor 107 and the second ID resistor 108 may be connected in parallel to the electronic device 103. The first ID resistor 107 may be connected to the second switch 106, the electronic device 103, and to ground. The second ID resistor 108 at the other end thereof. Herein, the first ID resistor 107 and the second ID resistor 108 may have resistance varying according to a user setting or according to the specification of the accessory 102.

The electronic device 103 may be connected to the accessory 102. Specifically, the electronic device 103 may be connected to the internal circuit 104 of the accessory 102, to the first switch 105, and to the second switch 106 and first ID resistor 107. The electronic device 103 may allow a current to flow to the first ID resistor 107 and the second ID resistor 108 respectively connected to the electronic device 103 to identify any one of first and second ID resistances. Specifically, since the second switch 106 is closed when the accessory 102 is being supplied with power, the electronic device 103 may identify the second ID resistance by allowing a current to flow to the first ID resistor 107 and the second ID resistor 108. The first ID resistance may be a resistance that may be identified by the electronic device 103 when the current applied by the electronic device 103 flows just through the first ID resistor 107. The second ID resistance may be a resistance that may be identified by the electronic device 103 when the current applied by the electronic device 103 is flows through the first ID resistor 107 and the second ID resistor 108. Device 103 identifies the second ID resistance by applying current to the accessory 102 and determines that the power supply device 101 is connected to the accessory 102. Therefore, the electronic device 103 may receive power, which has been supplied from the power supply device 101 to the accessory 102, from the accessory 102 without applying power to the accessory 102. Known accessory devices operate when power is applied to them from a power supply device or when power is applied to them from an electronic device.

Known electronic device apply power to an accessory, but are typically not supplied with power from the accessory.

In response to receiving power from the power supply device 101, the accessory 102 operates while also applying the power from the power supply device 101 to the electronic device 103, thereby overcoming limitations in a known accessory. In addition, when the electronic device 103 recognizes a predetermined ID resistance (second ID resistance) by applying a current to the accessory 102, the electronic device 103 determines that the power supply device 101 is connected to the accessory 102, and device 103 is charged by power from the accessory 102 without applying power to the accessory 102.

Figure 2:
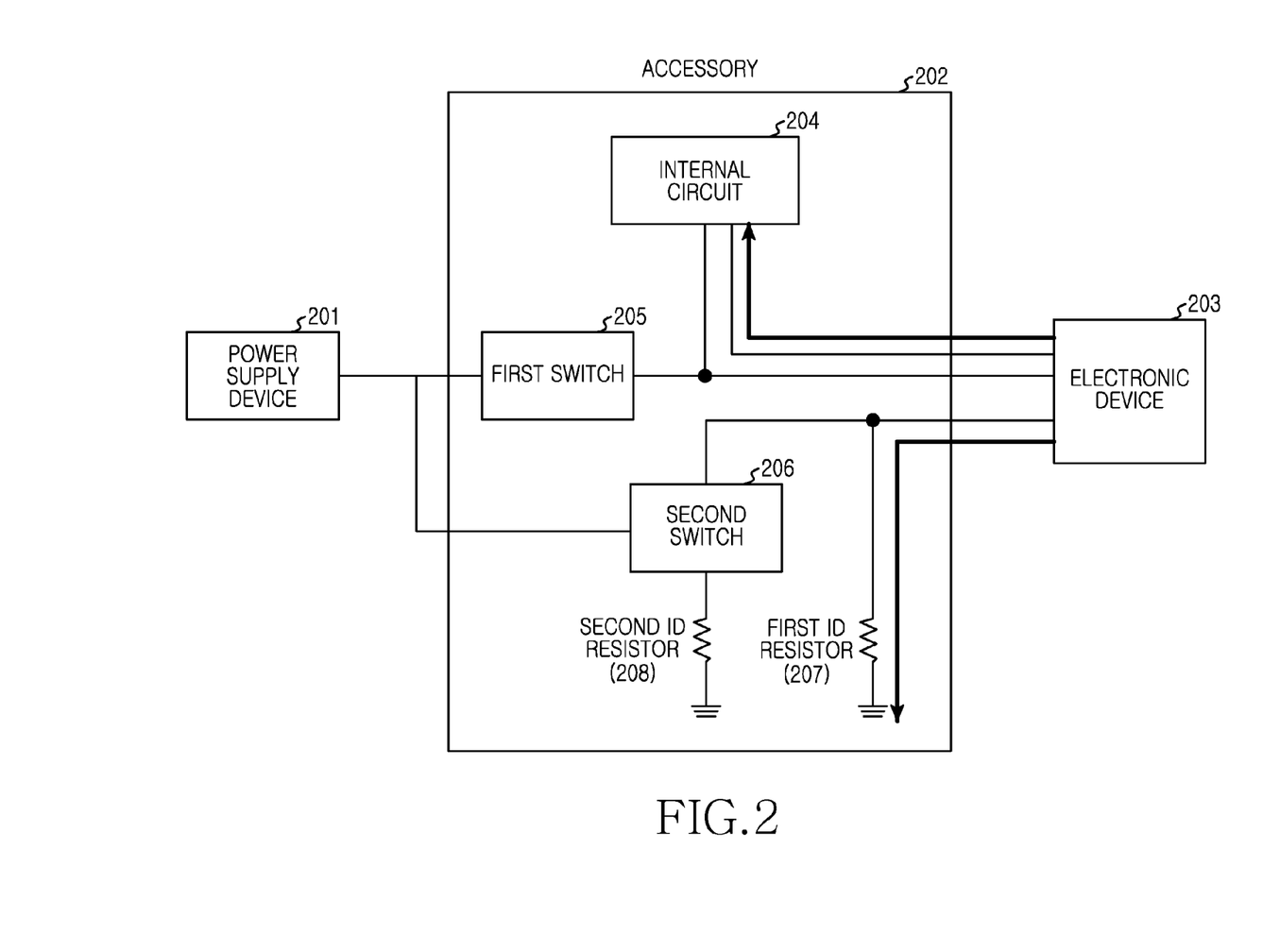
FIG. 2 shows an accessory and an electronic device when the accessory is not connected to a power supply device according to invention principles.

FIG. 2 shows an accessory 202 and an electronic device 203 when the accessory is not connected to a power supply device 201. The accessory 202 may include an internal circuit 204, a first switch 205, a second switch 206, a first ID resistor 207, and a second ID resistor 208. The internal circuit 204 included in the accessory 202 may be implemented using various circuits respectively configured according to the characteristics of respective accessories. The first switch 205 may operate differently depending on whether a power supply device 201 is connected to the accessory 202. Specifically, when the power supply device 201 is not connected to the accessory 202, the first switch 205 may maintain an open state and power is applied from the electronic device 203 to the internal circuit 204. The second switch 206 may operate differently depending on whether the accessory 202 is being supplied with power from the power supply device 201. Specifically, when the power supply device 201 is not connected to the accessory 202, the second switch 206 may maintain an open state to allow just the first ID resistor 207 to be connected to the electronic device 203.

The first ID resistor 207 may be connected to the second switch 207, the electronic device 203, and to ground. In addition, the second ID resistor 208 may be connected to the second switch 206 and to ground. Herein, the first ID resistor 207 and the second ID resistor 208 may have resistance varying according to a user settings or the specification of the accessory 202. The electronic device 203 may identify either one of first and second ID resistances by allowing a current to flow to the first ID resistor 207 and the second ID resistor 208 respectively. Specifically, since the second switch 206 maintains an open state when the accessory 202 is not connected to the power supply device 201, the electronic device 203 may identify the first ID resistance by allowing a current to flow to the first ID resistor 207.

The electronic device 203 may identify the resistance of the first ID resistor 107 by applying a current just to the first ID resistor 207 and may identify a voltage value corresponding to the first ID resistance and thereby determines that the power supply device 201 is not connected to the accessory 202. Therefore, the electronic device 203 applies power to the accessory 202 by using an OTG (On The Go) power supply included in the electronic device 203 to enable the accessory 202 to operate.

Figure 3:
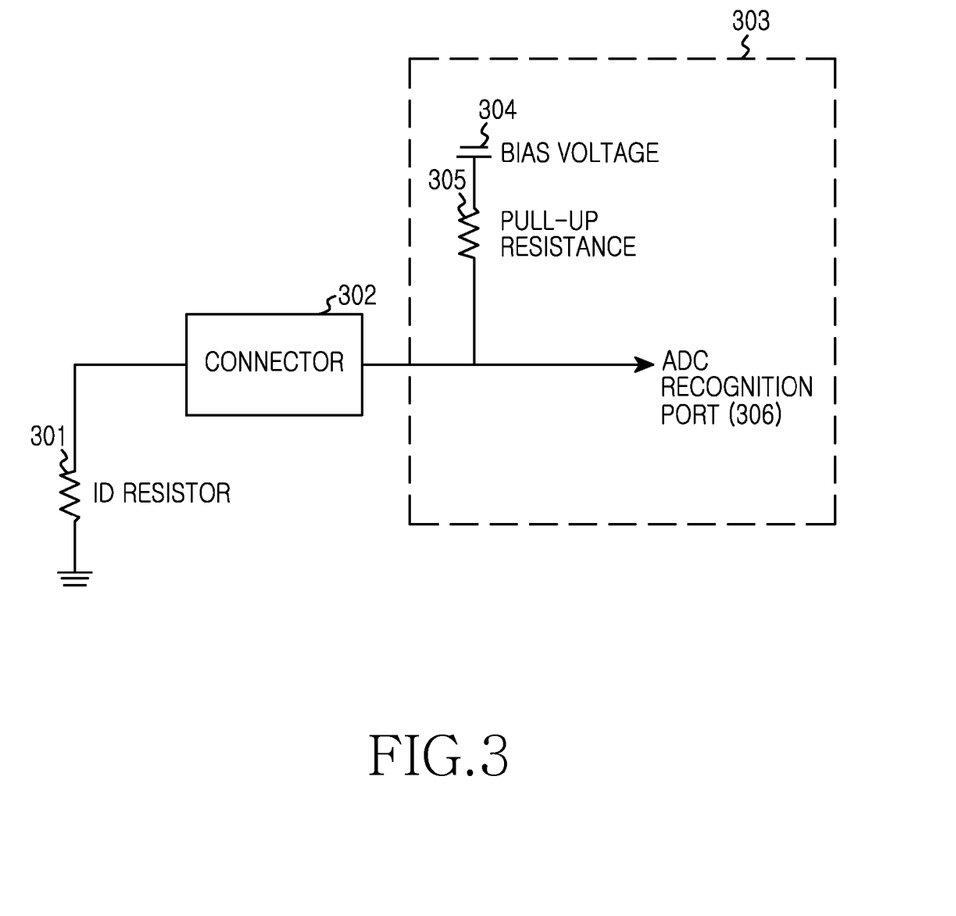
FIG. 3 shows a system for recognizing an ID (identifier) resistor included in an accessory by applying a current to the accessory according to invention principles.

FIG. 3 shows a system for recognizing an ID resistor included in an accessory by applying a current to the accessory including an ID resistor 301 and a connector 302 may be provided in the outer side of the accessory or separately from the accessory and the electronic device 303 to connect the accessory to the electronic device 303. The ID resistor 301 may comprise a first ID resistor and a second ID resistor. The electronic device 303 may include a bias voltage 304, a pull-up resistance 305 and an Analog-to-Digital Converter (ADC) recognition port 306 within the electronic device 303. A current applied from the bias voltage 304 included in the electronic device 303 flows to the ID resistor 301 included in the accessory through the pull-up resistor 305 and the connector 302 which are included within the electronic device. The electronic device 303 may recognize a voltage provided by the divider formed by the pull-up resistor 305 and the ID resistor 301. For example, it is assumed that the bias voltage 304 is 10 [V], the pull-up resistor 305 is 2K[Ω]. In addition, it is assumed that the first ID resistor is 8K[Ω], and the second ID resistor is 2K[Ω]. Device 303 identifies that, as a result of voltage division, a voltage of 2 [V] is developed across the pull-up resistor 305 and a voltage of 8 [V] is developed across the ID resistor 301, thereby identifying that the ID resistor included within the accessory has a resistance of 8K[Ω]. Therefore, the electronic device 303 may determine that only the first ID resistor is included within the accessory, thereby identifying that the accessory is not currently connected to the power supply device. Thereafter, since the electronic device 303 identifies that the accessory is not connected to the power supply device, the electronic device 303 may apply power to the accessory to enable the accessory to operate.

As another example, the pull-up resistor 305 is 2K[Ω], and the first ID resistor is 8K[Ω], and the second ID resistor is 2K[Ω] and measured divider voltage is 4.4 [V], thereby identifying that the ID resistor included within the accessory has a parallel combined resistance of 1.6 K[Ω] indicating that the first ID resistor and the second ID resistor are connected in parallel, thereby identifying that the accessory is being currently supplied with power from a power supply device. Therefore, the electronic device may be supplied with power from the power supply device without applying power to the accessory.

Figure 4:
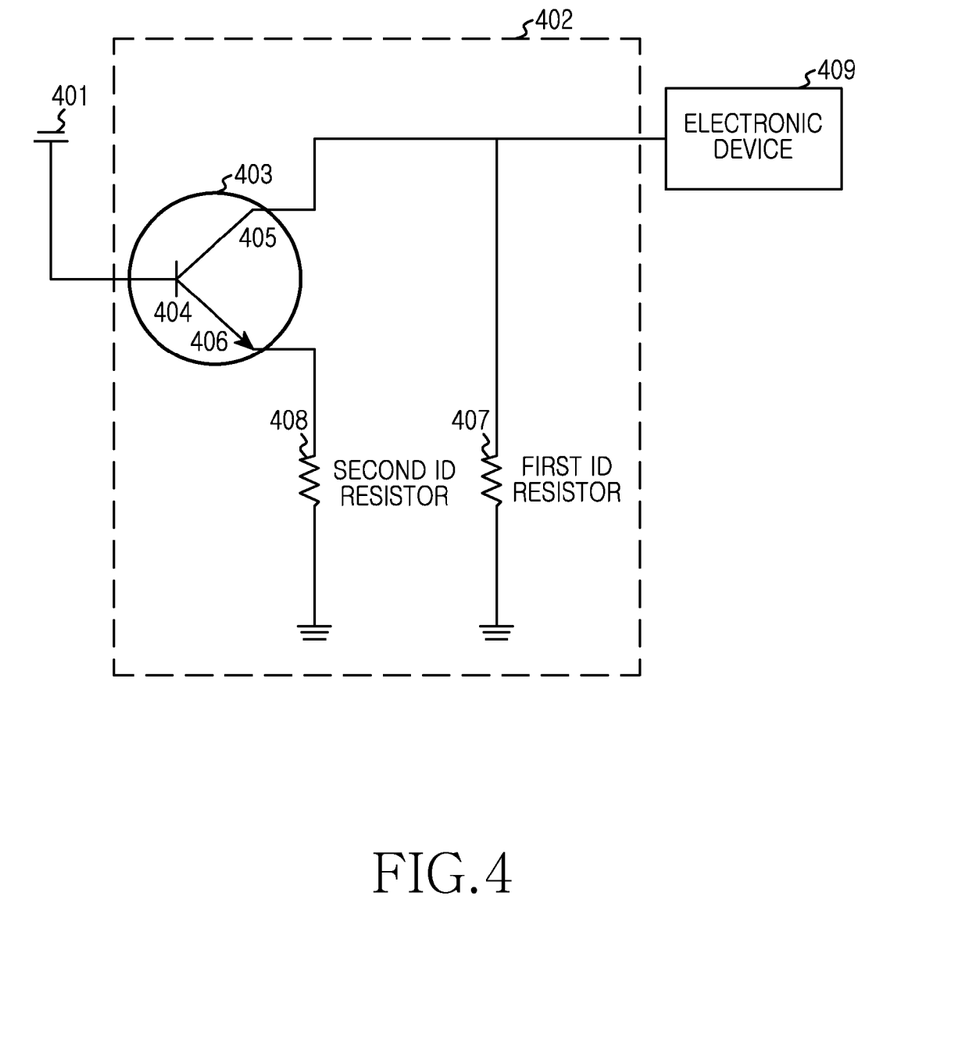
FIG. 4 shows a resistance switch according to invention principles.

FIG. 4 shows a second switch system using a device serving as a switch, such as a BJT (Bipolar Junction Transistor), a FET, or an analogue switch. A transistor 403 included within an accessory 402 may operate as a switch when being supplied with power from a power supply device 401. That is, when the accessory 402 is being supplied with the power from the power supply device 401, the base 404 of the transistor 403 included within the accessory 402 may enable the switch to change from an open state to a closed state. Specifically, the base 404 of the transistor 403 enables the switch that has been open to be closed, thereby allowing a current to flow from the collector 405 to the emitter 406. That is, when the accessory 402 is connected to the power supply device 401, the transistor 403 serves as a switch that changes from an open state to a closed state, thereby connecting a first ID resistor 407 and a second ID resistor 408 to the electronic device 409. However, when the accessory 402 is not connected to the power supply device 401, the transistor 403 does not perform switching, thereby maintaining the open switch state. Therefore, when the accessory 402 is not supplied with power from the power supply device 401, just the first ID resistor 407 may be connected to the electronic device 409.

Figure 5:
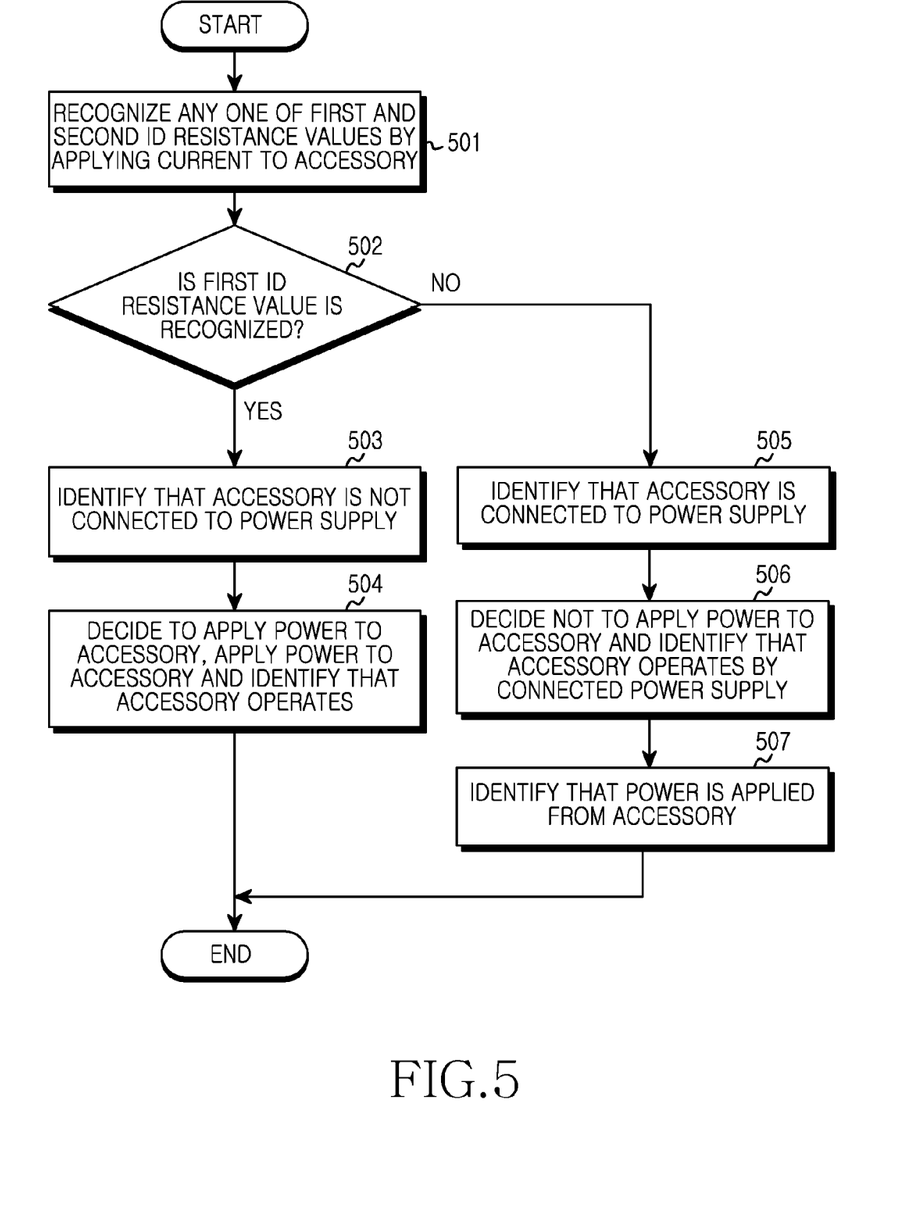
FIG. 5 shows a flowchart of a method comprising an operation sequence of an electronic device according to invention principles.

FIG. 5 shows a flowchart of an operation sequence of an electronic device where, in step 501, the electronic device recognizes one of first and second ID resistances by applying a current to an accessory. Specifically, since a second switch included in the accessory is closed when the accessory is supplied with power from a power supply device, the electronic device may identify the second ID resistance by applying a current to a first ID resistor and a second ID resistor. However, since the second switch included in the accessory maintains an open state when the accessory is not connected to the power supply device, the electronic device may identify the first ID resistance by applying a current just to the first ID resistor. In step 502, the electronic device may determine whether the identified ID resistance is the first ID resistance or the second ID resistance in the above-described step 501.

When the electronic device determines that the first ID resistance is identified in the above determination step 502, the electronic device may identify that the power supply device is not connected to the accessory in step 503 since the current applied by the electronic device flows only through the first ID resistor. In step 504, the electronic device identifies that the accessory is not connected to the power supply device, and applies power to the accessory to enable the accessory to operate. The electronic device may identify that the power supply device is connected to the accessory in step 505 by recognizing the second ID resistance. In step 506, the electronic device determines not to supply power to the accessory and identifies that the accessory operates using the connected power supply. In step 507, the electronic device may identify that the electronic device is supplied with power from the accessory that in turn receives the power from the power supply device. That is, the electronic device may be supplied with power from the accessory without applying power to the accessory.

Figure 6:
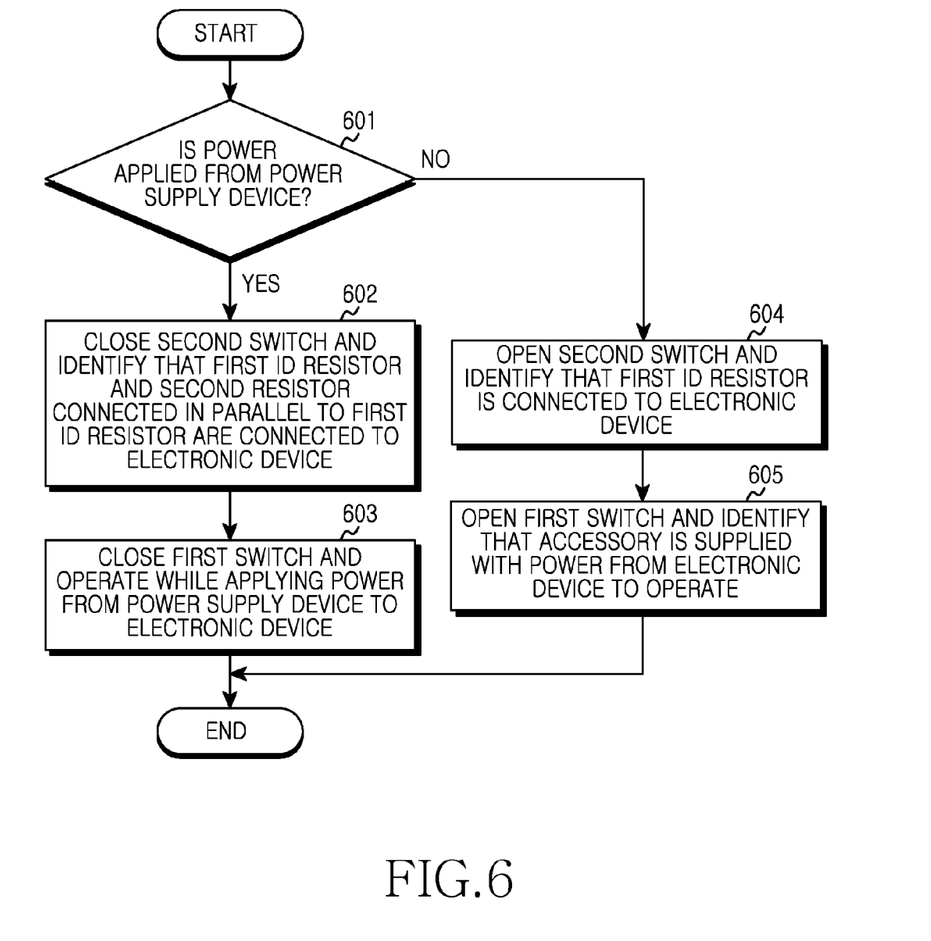
FIG. 6 shows a flowchart of a method comprising an operation sequence of an accessory according to invention principles.

FIG. 6 shows a flowchart of an operation sequence of an accessory where, in step 601, the accessory determines whether the accessory is being supplied with power from a power supply device. When the accessory is being supplied with power from the power supply device, the accessory may close the second switch and identify that a first ID resistor and a second ID resistor are connected in parallel in step 602. Specifically, when the accessory is connected to the power supply device to receive power from the power supply device, the accessory closes the second switch that has been open to connect the first ID resistor and the second ID resistor in parallel. In step 603, the accessory closes the first switch and operates while applying power from the power supply device to the electronic device. Specifically, when the accessory is being supplied with power from the power supply device, the accessory toggles the first switch from open to closed to supply power from the power supply device to an internal circuit and the electronic device.

When the accessory determines that the accessory is not supplied with power from the power supply device in step 601, the accessory may open the second switch and identify that the first ID resistor is connected to the electronic device in step 604. Specifically, when the accessory is not connected to the power supply device, the second switch included in the accessory maintains an open state to enable the first ID resistor to be connected to the electronic device. In step 605, the accessory may open the first switch and identify that the accessory is supplied with power from the electronic device. Specifically, when the accessory is not connected to the power supply device, the accessory maintains the first switch in the open state to enable the power applied by the electronic device to be applied to the internal circuit of the accessory.

Figure 7:
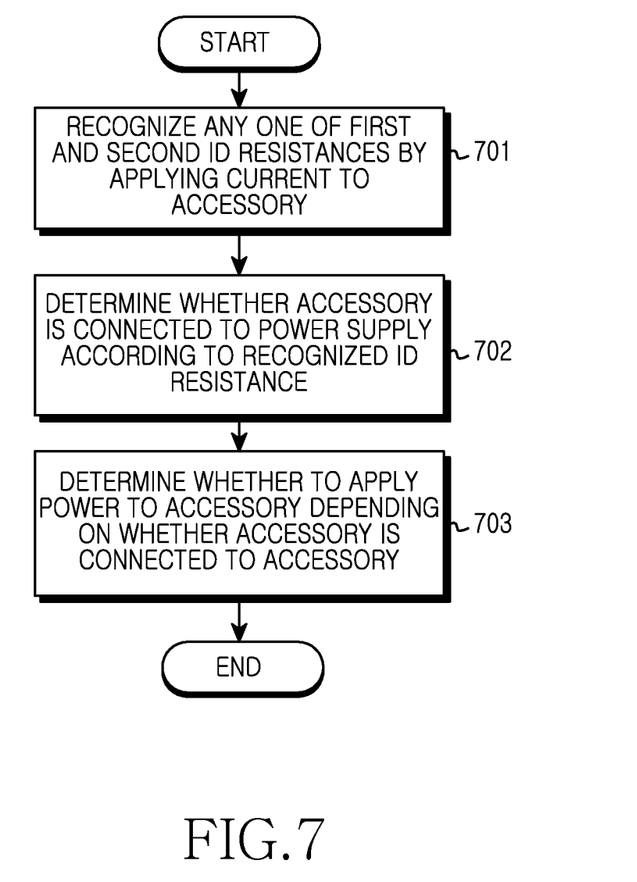
FIG. 7 shows a flowchart of a method employed by an electronic device according to invention principles.

FIG. 7 shows a flowchart of a method used by an electronic device where, in step 701, the electronic device may recognize one of first and second ID resistances by applying a current to an accessory. Specifically, since a second switch included in the accessory is closed when the accessory is supplied with power from a power supply device, the electronic device may identify the second ID resistance by applying a current to a first ID resistor and a second ID resistor. However, since the second switch included in the accessory maintains an open state when the accessory is not connected to the power supply device, the electronic device may identify the first ID resistance by applying a current only to the first ID resistor.

In step 702, the electronic device may determine whether an accessory is connected to a power supply in response to the value of the recognized ID resistance. That is, the electronic device may apply a current to the accessory to determine whether the identified ID resistance is the first ID resistance or the second ID resistance. In step 703, the electronic device may determine whether to apply power to the accessory. That is, when the electronic device determines that the first ID resistance is recognized, the electronic device may identify that the accessory is not connected to the power supply and decide to apply power to the accessory. Otherwise the electronic device may identify that the accessory is connected to the power supply and decide not to apply power to the accessory.

Figure 8:
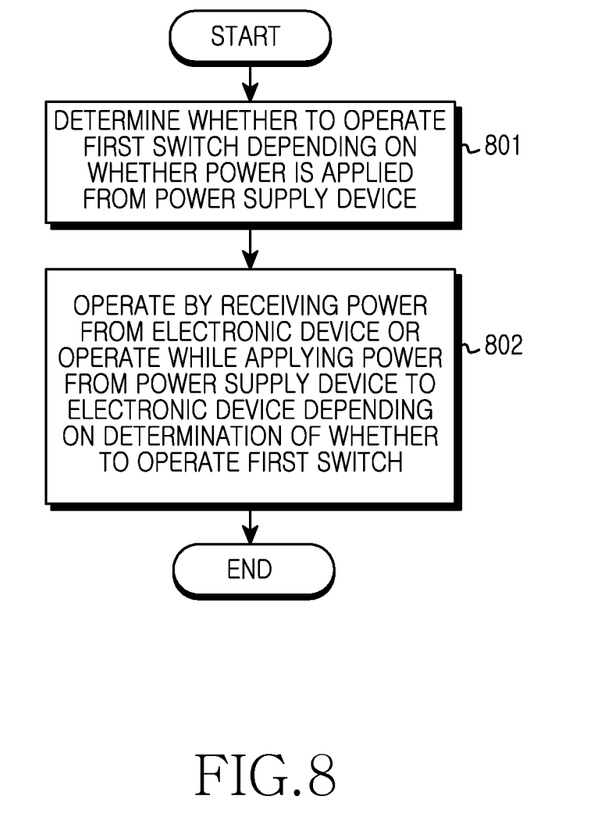
FIG. 8 shows a flowchart of a method employed by an accessory device according to invention principles.

FIG. 8 shows a flowchart of a method used by an accessory where, in step 801, the accessory may determine whether to operate a first switch depending on whether the accessory is being supplied with power from a power supply device. Specifically, when the accessory is being supplied with power from the power supply device, the accessory switches the first switch from open to closed to supply power from the power supply device to an internal circuit and the electronic device. However, when the accessory is not connected to the power supply device, the accessory maintains the first switch in the open state to enable the power applied by the electronic device to be applied to the internal circuit of the accessory. In step 802, the accessory operates by receiving power from the electronic device or operates while applying power from the power supply device to the electronic device depending on whether the first switch operates. Specifically, since the accessory is connected to the power supply device when the accessory closes the first switch, the accessory may apply power from the power supply device to the internal circuit and the electronic device.

Figure 9:
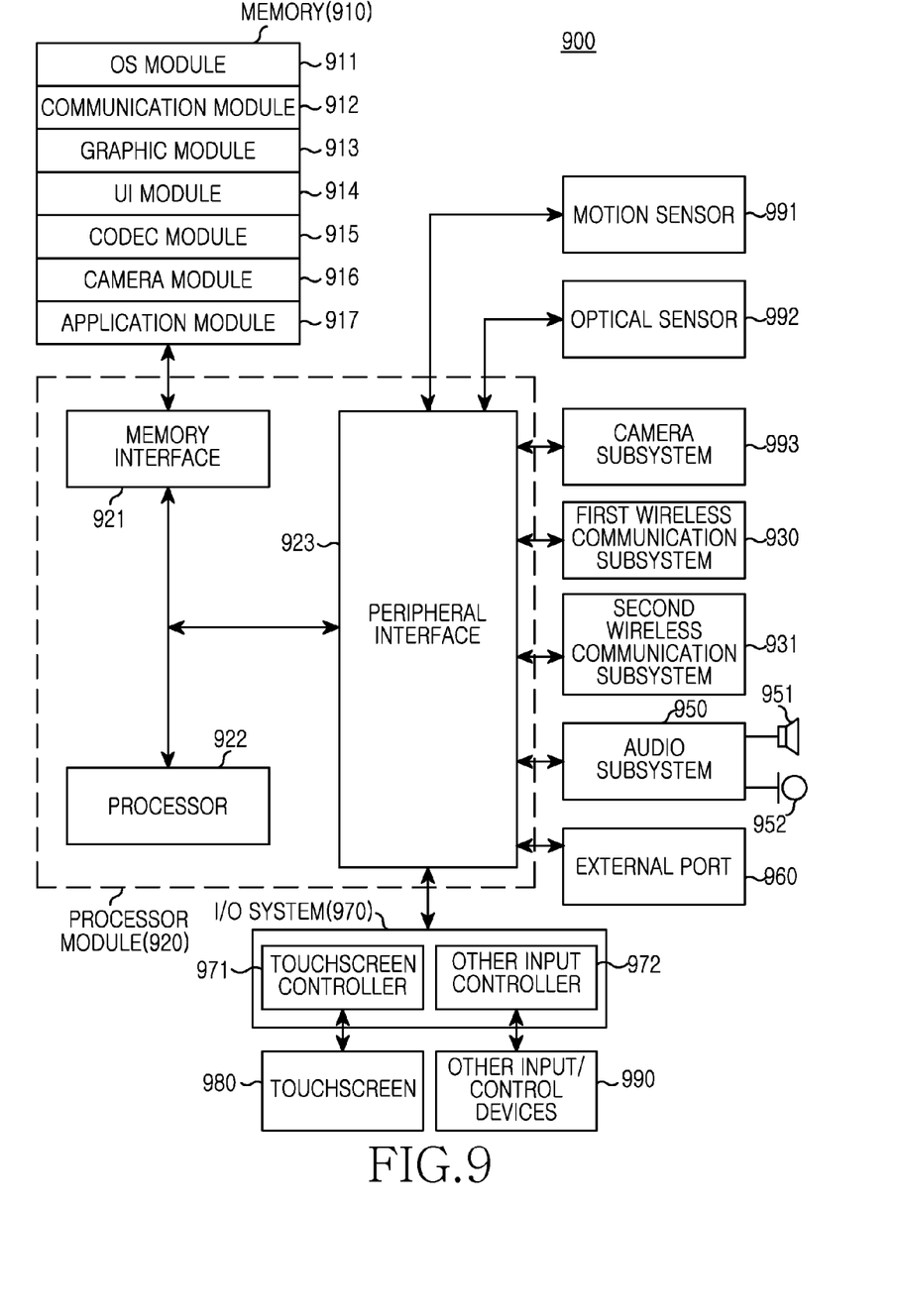
FIG. 9 shows an electronic device according to invention principles.

FIG. 9 shows an electronic device 900 comprising a portable electronic device, such as a portable terminal, a mobile phone, a mobile pad, a media player, a tablet computer, a handheld computer, or a Personal Digital Assistant (PDA). In addition, the electronic device may be a portable electronic device having two or more functions of the above-described devices. The electronic device 900 includes a memory 910, a processor module 920, a first wireless communication subsystem 930, a second wireless communication subsystem 931, an external port 960, an audio subsystem 950, a speaker 951, a microphone 952, an input/output (I/O) system 970, a touchscreen 980, and other input/control devices 990. The memory unit 910 and the external port 960 may comprise multiple units.

The processor module 920 may include a memory interface 921, at least one processor 922, and a peripheral interface 923, the processor module 920 may also be referred to as a processor. The processor module 920 recognizes first and second ID resistances by applying a current to an accessory, to determine whether the accessory is connected to a power supply in response to the recognized ID resistance, and determines whether to apply power to the accessory depending on whether the accessory is connected to the power supply. The processor module 920 may identify that the accessory is not connected to the power supply when the first ID resistance is recognized. The processor module 920 may identify that the accessory is connected to the power supply when the second ID resistance is recognized.

The processor module 920 may decide to apply power to the accessory when it is determined that the accessory is not connected to the power supply, and decide not to apply power to the accessory when it is determined that the accessory is connected to the power supply. The processor module 920 may apply power to the accessory and identifies that power is applied to the accessory. In addition, the processor module 920 identifies that the accessory operates using the power supply connected to the electronic device.

The processor module 920 executes different software programs to perform different functions for the electronic device 900, and performs processes and controls voice communication and data communication. In addition to these functions, the processor 922 executes a specific software module (instruction set) stored in the memory 910 and performs different specific functions corresponding to the software module. That is, the processor 922 performs methods in cooperation with software modules stored in the memory 910. The processor 922 may include at least one data processor, image processor, or codec. The data processor, the image processor, or the codec may be configured separately. In addition, the processor 922 may be configured by a plurality of processors performing different functions. The peripheral interface 923 connects different peripheral devices and the I/O subsystem 970 of the electronic device 900 to the processor 922 and the memory 910 (through the memory interface). The different elements of the electronic device 900 may be coupled by at least one communication bus (not illustrated) or signal line (not illustrated). The external port 960 is used to connect a portable electronic device (not illustrated) to other electronic devices directly or indirectly through a network (for example, Internet, Intranet, or wireless LAN). The external port 960 may be, for example, a universal serial bus (USB) port or a FireWire port, but is not limited thereto.

A motion sensor 991 and an optical sensor 992 may be connected to the peripheral interface 923 to enable different functions including to detect motion of the electronic device and detect light from the outside. In addition, other sensors, such as a positioning system, a temperature sensor, and a biosensor, may be connected to the peripheral interface 923 to perform relevant functions. A camera subsystem 993 may perform camera functions such as photographing and video clip recording. The optical sensor 992 may include a CCD (charged coupled device) or a CMOS (complementary metal-oxide semiconductor) device. A communication function is performed through one or more wireless communication subsystems 930 and 931. The wireless communication subsystems 930 and 931 may include a radio frequency (RF) receiver and transceiver and/or an optical (e.g., infrared) receiver and transceiver. The communication networks may include, but are not limited to, a GSM (Global System for Mobile Communication) network, an EDGE (Enhanced Data GSM Environment) network, a CDMA (Code Division Multiple Access) network, a W-CDMA (W-Code Division Multiple Access) network, an LTE (Long Term Evolution) network, an OFDMA (Orthogonal Frequency Division Multiple Access) network, a WiFi (Wireless Fidelity) network, a WiMax network, and/or a Bluetooth network. The first wireless communication subsystem 930 and the second wireless communication subsystem 931 may be integrated with each other as one wireless communication subsystem.

The audio subsystem 950 is connected to the speaker 951 and the microphone 952 to perform audio stream input/output functions such as voice recognition, voice replication, digital recording, and telephone functions. That is, the audio subsystem 950 communicates with the user through the speaker 951 and the microphone 952. The audio subsystem 950 receives a data stream through the peripheral interface 923 of the processor module 920 and converts the received data stream into data stream. The data stream is transmitted to the speaker 951. The speaker 951 converts the data stream into sound waves audible by humans and outputs the same. The microphone 952 converts sound waves received from humans or other sound sources into a data stream. The audio subsystem 950 receives the data stream from the microphone 952. The audio subsystem 950 converts the received data stream into an audio data stream and transmits the audio data stream to the peripheral interface 923. The audio subsystem 950 may include an attachable/detachable earphone, a headphone, or a headset.

The I/O subsystem 970 may include a touchscreen controller 971 and/or an other input controller 972. The touchscreen controller 971 may be connected to the touchscreen 980. The touchscreen 980 and the touchscreen controller 971 may detect a touch or a motion by using multi-touch detection functions including, but not limited to, a proximity sensor array or other elements, as well as capacitive, resistive, infrared and surface acoustic wave methods for determining one or more touch points on the touchscreen 980. The other input controller 972 may be connected to the other input/control devices 990. The other input/control device 990 may include one or more buttons, a rocker switch, a thumb wheel, a dial, a stick, and/or a pointer device such as a stylus.

The touchscreen 980 provides an I/O interface between the electronic device 900 and the user. That is, the touchscreen 980 transmits a user touch input to the electronic device 900. Also, the touchscreen 980 is a medium that displays an output from the electronic device 900 to the user including text, graphics, a video, or a combination thereof. The touchscreen 980 may use different display technologies. For example, the touchscreen 980 may use, but is not limited to, an LCD (liquid crystal display), an LED (Light Emitting Diode), an LPD (light emitting polymer display), an OLED (Organic Light Emitting Diode), an AMOLED (Active Matrix Organic Light Emitting Diode), or an FLED (Flexible LED).

The memory unit 910 may include one or more high-speed random-access memories (RAMs) such as magnetic disk storage devices, one more nonvolatile memories, one or more optical storage devices, and/or one or more flash memories (for example, NAND flash memories or NOR flash memories). The memory 910 stores software including an operation system (OS) module 911, a communication module 912, a graphic module 913, a user interface (UI) module 914, a codec module 915, a camera module 916, and one or more application modules 917. A module comprises a set of instructions or a program. The OS software 911 (for example, WINDOWS, LINUX, Darwin, RTXC, UNIX, OS X, or an embedded OS such as VxWorks) includes different software components for controlling system operations. For example, system operation controls may include memory control/management, storage hardware (device) control/management, and power control/management. The OS software also performs a function for enabling smooth communication between different hardware components (devices) and software components (modules).

The communication module 912 may enable communication with other electronic devices (such as computers, servers, and/or portable terminals) through the wireless communication subsystems 930 and 931 or the external port 960. The graphic module 913 includes different software components for providing and displaying graphics on the touchscreen 980. The graphics include texts, web pages, icons, digital images, videos, and animations. The UI module 914 includes different software components related to a user interface. Through the user interface module, the electronic device provides information about the state of the user interface and/or information conditions prompting user interface changes. The codec module 915 may include software components related to video file encoding/decoding. The codec module may include a video stream processing module such as an MPEG module or an H204 module. Also, the codec module may include different audio file codec modules such as AAA, AMR, and WMA modules. The camera module 916 may include camera-related software components that enable camera-related processes and functions. The application module 917 includes a browser application, an e-mail application, an instant message application, a word processing application, a keyboard emulation application, an address book application, a touch list application, a widget application, a digital right management (DRM) application, a voice recognition application, a voice replication application, a position determining function application and a location-based service (LBS) application, for example.

Figure 10:
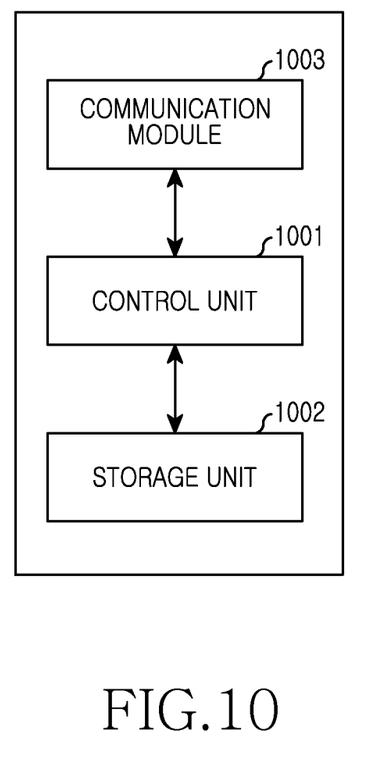
FIG. 10 shows an accessory configuration according to invention principles.

FIG. 10 shows an accessory architecture including a control unit 1001, a storage unit 1002 and a communication module 1003. The control unit 1001 may control operation of the accessory (1002) and control the first and second switches as previously described. The storage unit 1002 may include a program storage unit for storing a program for controlling an operation of the accessory, and a data storage unit for storing data generated during the execution of the program. The communication module 1003 may process signals transmitted and received through an antenna for voice and data communication. The control unit 1001 may perform functions of the accessory.

It will be appreciated that the system can be realized in the form of hardware, via the execution of software or a combination of hardware and software. Such software may be stored in a non-transient computer readable storage medium. The non-transient computer readable storage medium stores one or more programs (software modules), the one or more programs comprising instructions, which when executed by one or more processors in an electronic device, cause the electronic device to perform the described methods. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions. Accordingly, embodiments provide a program comprising code for implementing apparatus or a method as claimed in any one of the claims of this specification and a machine-readable storage storing such a program. Still further, such programs may be conveyed electronically via a medium such as a communication signal carried over a wired or wireless connection and embodiments suitably encompass the same. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

While the disclosure has been shown and described with reference to certain exemplary embodiments thereof, it will be understood by those skilled in the art that different changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method employed by an accessory device having an identifier resistor attached to an electronic device, the identifier resistor including a first identifier resistor and a second identifier resistor, comprising:
   when a power supply device is connected to the accessory device, closing a first switch and a second switch of the accessory device using power supplied from the power supply device;
   when the power supply device is disconnected from the accessory device, opening the first switch and the second switch of the accessory device, such that when the second switch is closed, the first identifier resistor and the second identifier resistor are connected in parallel, and when the second switch is opened, the second identifier resistor is inoperative; and
   detecting a voltage across the identifier resistor, wherein:
      when the second switch is opened, the detected voltage is a first voltage corresponding to the first identifier resistor, and
      when the second switch is closed, the detected voltage is a second voltage corresponding to a parallel combination of the first identifier resistor and the second identifier resistor.

2. The method of claim 1, wherein detecting the voltage across the identifier resistor further comprises:
   supplying a bias current via a pull-up resistor to the identifier resistor.

3. The method of claim 1, further comprising operating the accessory device using power supplied from the electronic device when the detected voltage is the first voltage.

4. The method of claim 1, further comprising operating the accessory device and/or the electronic device using the power supplied from the power supply device when the detected voltage is the second voltage.

5. The method of claim 1, wherein the first switch and the second switch are parallel with respect to the power supply device.

6. An accessory device attached to an electronic device, the accessory device comprising:
   a first switch;
   a second switch;
   an identifier resistor comprising a first identifier resistor and a second identifier resistor; and
   a control unit configured to:
      when a power supply device is connected to the accessory device, close the first switch and the second switch using power supplied from the power supply device,
      when the power supply device is disconnected from the accessory device, open the first switch and the second switch, wherein:
         when the second switch is closed, the first identifier resistor and the second identifier resistor are connected in parallel, and when the second switch is opened, the second identifier resistor is inoperative, when the second switch is opened, a first voltage corresponding to the first identifier resistor is detectable across the identifier resistor, and when the second switch is closed, a second voltage corresponding to a parallel combination of the first identifier resistor and the second identifier resistor is detectable across the identifier resistor.

7. The accessory device of claim 6, wherein a bias current via a pull-up resistor is supplied from the electronic device to the identifier resistor.

8. The accessory device of claim 6, wherein the control unit is further configured to operate the accessory device using power supplied from the electronic device when the first voltage is detected.

9. The accessory device of claim 6, wherein the control unit is further configured to operate the accessory device using the power supplied from the power supply device when the second voltage is detected.

10. The accessory device of claim 6, wherein the first switch and the second switch are parallel with respect to the power supply device.

* * * * *